June 3, 1947. W. J. MILLER 2,421,572
APPARATUS FOR FEEDING CLAY TO MOLDS IN THE MANUFACTURE OF POTTERYWARE
Original Filed Oct. 6, 1941 3 Sheets-Sheet 1
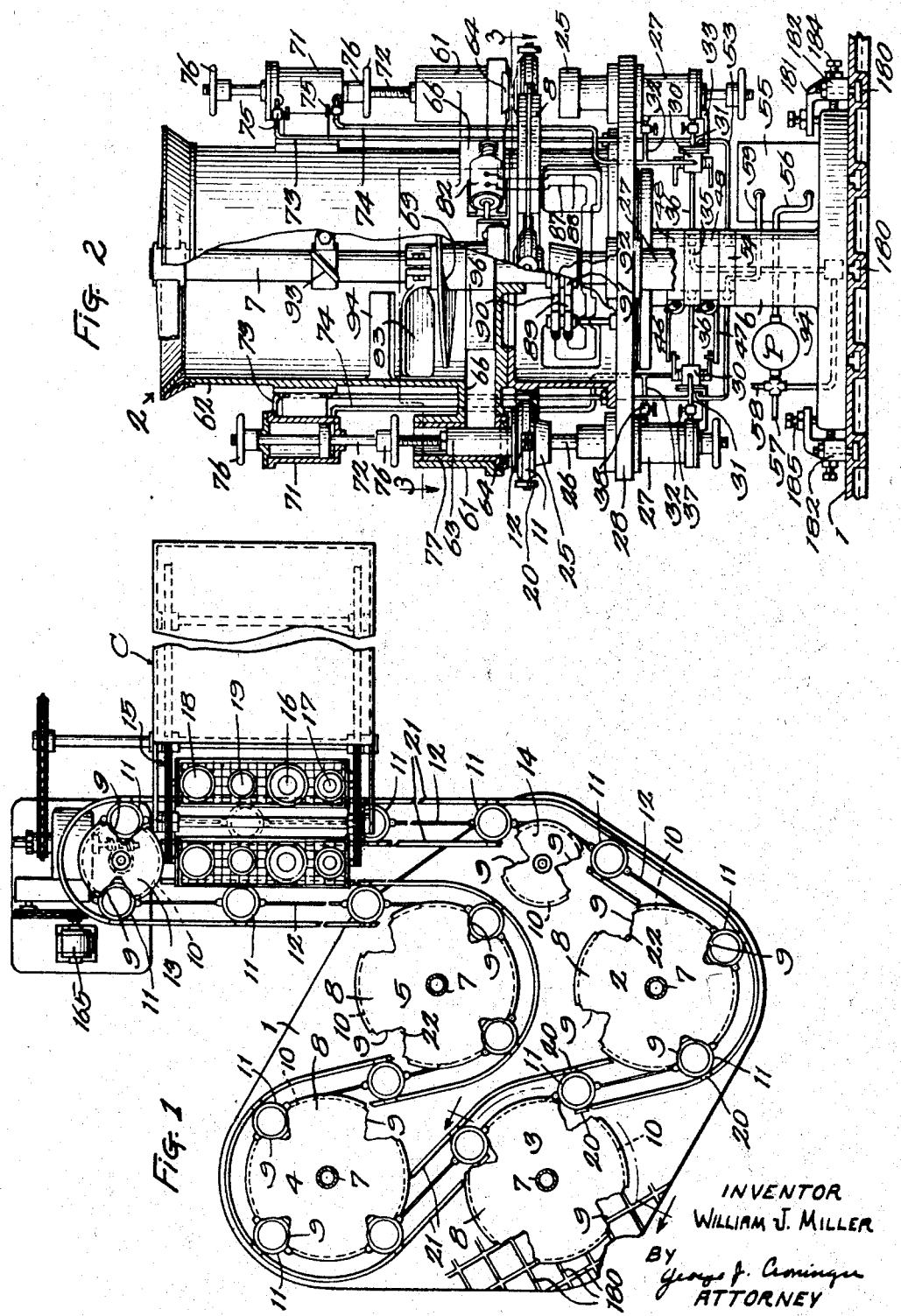
INVENTOR
WILLIAM J. MILLER
BY
George J. Cominger
ATTORNEY June 3, 1947. W. J. MILLER 2,421,572
APPARATUS FOR FEEDING CLAY TO MOLDS IN THE MANUFACTURE OF POTTERYWARE
Original Filed Oct. 6, 1941 3 Sheets-Sheet 2

INVENTOR
William J. Miller
BY George J. Croninger
ATTORNEY

June 3, 1947.    W. J. MILLER    2,421,572
APPARATUS FOR FEEDING CLAY TO MOLDS IN THE MANUFACTURE OF POTTERYWARE
Original Filed Oct. 6, 1941    3 Sheets-Sheet 3
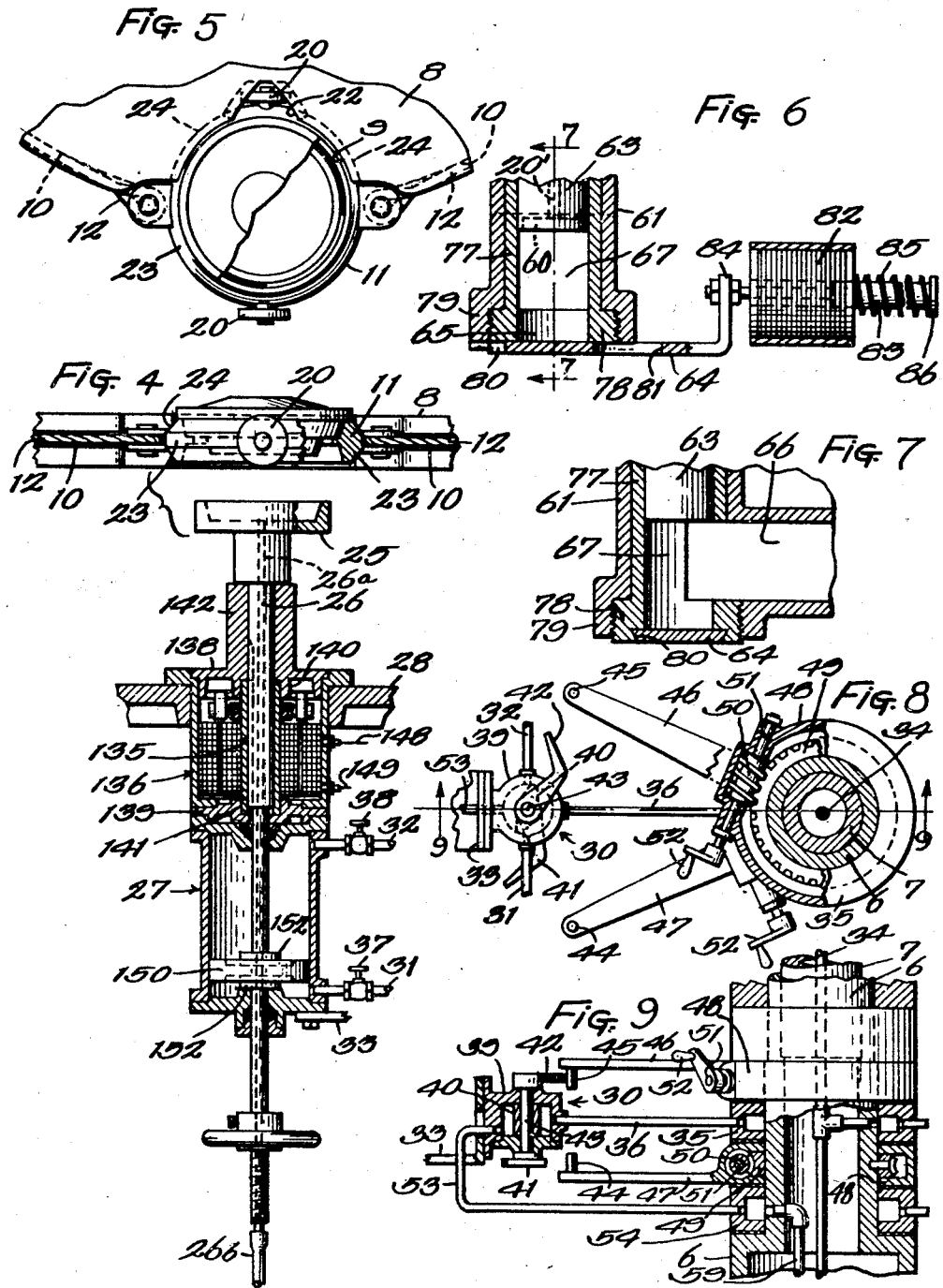
INVENTOR
WILLIAM J. MILLER
BY George J. Croninger
ATTORNEY Patented June 3, 1947

2,421,572

UNITED STATES PATENT OFFICE 2,421,572

APPARATUS FOR FEEDING CLAY TO MOLDS IN THE MANUFACTURE OF POTTERY WARE

William J. Miller, Swissvale, Pa., assignor to Miller Pottery Engineering Company, Swissvale, Pa., a corporation of Pennsylvania Original application October 6, 1941, Serial No. 413,734. Divided and this application September 22, 1943, Serial No. 503,375

27 Claims. (Cl. 25—103)

This application is a division of my co-pending application Serial No 413,734, filed October 6, 1941.

This invention relates to apparatus for manufacturing potteryware. It has to do with the production of jiggered ware, such as plates, cups and saucers and the like, from plastic clay on absorbent molds.

This application has to do particularly with the apparatus for feeding clay to the molds of the potteryware forming apparatus shown and described in detail in the co-pending application supra.

According to the present invention, the molds are moved in single file along a predetermined path and at locations spaced along said path, clay is fed to the molds and formed thereon, all whilst the molds are in continuous motion. The ware is thereafter dried and the molds returned for refilling.

One object of this invention is to provide a system and apparatus wherein productive operation is on a continuous and not intermittent scale, and to increase production capacity and speeds.

Another object is to provide for a wide range of production diversification whereby, due to this feature or the high speed feature, or both, the system will be highly adaptable to the high form diversity requirements of small potteries and the low form diversity high speed requirements of large potteries making a more standardized production.

Another object is to eliminate the need for skilled craftsman and to reduce manual intervention to a minimum. A further object is to simplify apparatus and procedure and reduce factory space requirements.

In the drawings:

Fig. 1 is a diagrammatic illustration of the machine as seen in plan.

Fig. 2 is a view partly in elevation and partly in section of the clay charging organization of the machine.

Fig. 4 is an enlarged sectional detail of certain parts of the apparatus.

Fig. 5 is a plan view of parts seen in Fig. 4.

Fig. 6 is an enlarged detail section taken on the section line 6—6 of Fig. 3.

Fig. 7 is a detail section taken on the section line 7—7 of Fig. 6.

Fig. 8 is an enlarged detail plan section of valve actuating mechanism.

Fig. 9 is a sectional view taken on the section line 9—9 of Fig. 8.

Figure 3:
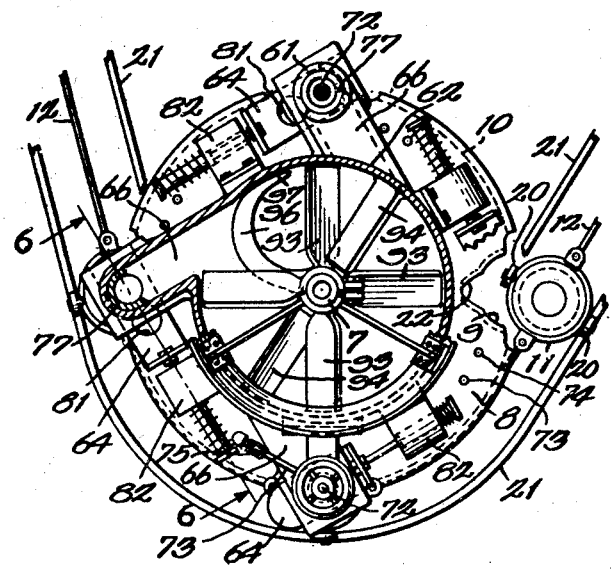
Fig. 3 is a sectional plan view of the clay charging organization as taken substantially on the section line 3—3 of Fig. 2.

As diagrammatically seen in Fig. 1, the machinery has a base 1, upon which are mounted the machines for performing the various operations. Said machines include a mold charging machine 2, a preforming machine 3 and a jiggering machine 4 and if desired, an additional jiggering machine 5 for purposes to be later described. Each machine has a stationary pedestal 6, a hollow center shaft 7 and a rotatable table, 8, Figs. 2 and 3, having semi-circular peripheral sockets 9 and a peripheral groove 10 for receiving and supporting the mold supporting rings 11 and inter-connecting cable sections 12, which together, form an endless conveyor for the transportation of molds.

The conveyor which moves continuously is arranged in a horizontal plane and is also looped around a sprocket-like drive member 13 driven by motor 165 and an idler 14 each provided with sockets 9 and peripheral cable grooves 10.

In regard to the location and arrangement of these machines, it has been stated hereinbefore that ample time is to be provided for properly performing the various operations mentioned. The optimum time interval for each operation will be that which in practice is indicated to be correct for each operation. Once these requirements are determined, the other factors, such as the amount of conveyor in association with each table, the diameter of the table, the speed of rotation thereof and the speed of travel of the conveyor can be determined.

For illustrative purposes, it will be assumed herein that the jiggering operation requires the longest interval of time to complete, as it normally does. The pressing or preforming tool takes the least time and the feeding operation requires about the same length of time as preforming. Thus, the machines are so arranged that for feeding, the conveyor is associated with the table of machine 2 for about 180°.

The organized machinery is capable of making round jiggered pottery dinner ware, such as plates, cups and saucers and the like. Production may be diversified, if desired, and various types and forms of ware made in succession as illustrated by molds 16, 17, 18, and 19, representing both hollow ware and flat ware types. The maximum range of product diversification at any one time is herein illustrated, for example, as four and the molds therefore are arranged on the conveyor in sets of four, the molds of each set in the entire conveyor circuit corresponding to all other sets as to position, type, capacity, etc. A sample production set-up would be (1) a dinner plate, (2) cup, (3) saucer and (4) bowl and all the machinery would be adapted throughout to accommodate this production which would involve proper tools, chucks, mold seats, operational adjustment, etc. Changes in the production set-up may be made whenever desired, the amount and extent of machine re-adjustment and replacement of tools, chucks and other parts depending on the size of the molds and the type of ware involved.

With reference to the mold conveyor, the mold supports 11 have two rollers 20 adapted to ride upon track sections 21 and to be received freely within vertical notches 22, Fig. 5, of table 8 when the supports are associated with the sockets 9. The supports are held firmly level in vertical location in the sockets by the outwardly tapered peripheral tongue 23 within correlatively formed groove portions 24 in the side walls of sockets 9, Fig. 5, and when in such association, the mold registers with a mold lifter or chuck 25 therebelow and feeding or fabricating equipment thereabove, depending on the machine. The mold lifters and the feeding or fabricating apparatus are herein shown as actuated by fluid motors, all substantially similar in construction and operation.

The mold chucks 25 are mounted on the top ends of vertical pistons 26 of piston and cylinder type fluid pressure-operated motors 27 secured to the rotatable tables 28 of the machines. Each piston rod preferably has a vacuum conduit 26a, connected to a vacuum hose 26b for intermittently vacuumizing the mold chucks 25 of the machines. Generally, the motors 27 are operated to raise and lower the molds in timed relation with the movement of the conveyor, by the motors 27 being alternately connected with a suitable source of fluid under pressure, by way of an automatically operated four-way control valve 30, Fig. 9, cooperating between conduits 31 and 32, leading from the ends of the cylinder and a supply conduit system leading to said source. The valves 30 are supported by brackets 33 on the cylinder housings.

The piping system of the feeder includes a central stationary conduit 34 inside the pedestal, leading from a pump P to an interiorly grooved hollow ring-like distributor head 35 rotatable on the pedestal and connected to the valves 30, through pipes 36. Pipes 31 and 32 to the motors 27 have manually operated control valves 37 and 38 respectively to control the rate of flow of fluid to the motors 27 in regulating the speed of movement of the mold chucks to raised and lowered positions.

The valves 30 and the means for automatically operating same are described in Patent 2,293,070. As shown in Figs. 8 and 9, the valves 30 are of the oscillating four-way type, each having an upright cylindrical valve-casing 39 through which the conduits 31 and 32 are alternately connected to conduit 36 by an oscillating plug type valve member 40 which is oscillated by two cam levers 41 and 42 on the shaft 43, which during rotation of the table 28 are successively engaged by cam pins 44 and 45 on the ends, respectively of stationary cam arms 47 and 46 adjustably mounted on the pedestal 6 of each machine. Each arm has at its inner end, an internally grooved hub 48 within which is disposed a ring gear 49 secured on the pedestal and meshing with a worm 50 on a shaft 51 mounted in bearings of the hob. A hand-crank 52 on the shaft 51 is for rotating the worm to adjust the arms about the axis of the pedestal. The hubs 48 of the arms are arranged on opposite sides of the distributor-ring 35 to support same in vertical position on the pedestal.

Each valve 30 has a vent pipe 53, leading to a distributor 54 similar to distributor 35 and the outlet side of this distributor is connected by pipe 59 to a tank 55 from which an intake line 56 leads to the pump P. The pump P and tank 55 may be common to all machines and connected by pipes 57 and 58 to the preformer and jigger.

In that the molds for producing the various articles only vary as to the shape and depth of the molding surfaces thereof, and are well-known in the art, it is considered sufficient to mention that the mold chucks for cooperating with same vary in depth of cavity and range of reciprocation accordingly in raising same out of the carriers.

Referring to Figs. 2, 3, 6, and 7, the mold charging machine 2 has four charger units arranged respectively above the sockets 9 and designed to place measured preformed clay charges onto the center of the molding surface of the molds, as they are raised into cooperative relation therewith. To this end, each charging unit includes an upright charging cylinder 61 mounted on the container 62 and arranged in co-axial alignment with a mold chuck, and within which reciprocates a charging plunger 63, which, when in raised position, cooperates with a sliding gate 64 at the discharging end 65 of the cylinder to form a clay-charge-measuring chamber 67. Clay is fed into the measuring chambers of the units by way of passages or ducts 66 connecting the chamber with the interior of container 62 which together with auger 69 forms an upright clay extrusion device. The container is supported by table 8 and is rotatable therewith whilst the auger 69 is mounted on shaft 7 and is stationary.

When a mold is raised into cooperative relation with a charging unit, the gate 64 of said unit is opened and the plunger 63 thereof is lowered to eject the charge of clay from the chamber 67 through the discharge outlet thereof (which may be referred to as a nozzle) and forcefully place and stick the same to the center of the molding surface of the mold, whereupon, air under pressure is blown through conduit 20 and the porous head 60 of the plunger to release the charge therefrom. Then the piston is raised and the gate closed, preparatory to the next operation as the mold is lowered onto its carrier.

Each plunger is reciprocated by a cylinder-and-piston type fluid pressure operated motor 71 mounted on the container 62 and having a depending piston-rod 72 on whose bottom and the plunger is secured. The upper and lower ends of the cylinders of the motors 71 are inter-connected, respectively, with the lower and upper ends of the cylinders of their respective chuck-motors therebelow by way of conduits 73 and 74 branching from the conduits 31 and 32 of the chuck motors whereby the plunger and chuck motors will operate in unison. In each of the conduits 73 and 74 is a valve 75 to control the flow of fluid to the plunger motors in regulating the rate of movement of the plungers.

To regulate the uppermost position of the plunger 63 in finally determining the size, weight or volume of the clay charge to be fed thereby, the piston rods 72 thereof may extend through bearings in the end-walls of the motor cylinders with adjustable hand nuts 76 threaded on the pistons for engaging said end-walls to limit movement of the piston. To regulate the lowermost position of the plunger and its nearest approach to the molding surface and thus determine the thickness of clay therebetween the top nut is accordingly adjusted. To enable materially increasing or decreasing the capacity of the measuring chambers of the charger units, each cylinder 61 thereof is provided with an inner detachable cylinder portion or liner 77 having an enlarged exteriorly threaded lower end 78 threaded into the enlarged lower end 79 of the cylinder, whereby it may be removed therefrom and another liner of a smaller or larger inner diameter may be substituted therefor to change the capacity of the chambers. Accordingly, the plungers 63 are threaded onto the piston rods 72 so that various sizes of plunger may be attached thereto in accordance with the sizes of the inner cylinder liners 77.

The gate 64 for each charger unit is in the form of an elongated slide-plate guided for reciprocation within a guideway 80 formed across the bottom-end of the cylinder liner 77 of the unit and is provided with an opening 81 which registers with the discharge outlet end of the charger cylinder thereof at one limit of movement of the slide. Although, the gates may be operated by any suitable means, each is reciprocated by an electric solenoid 82 mounted on the side wall of the pug mill with the sliding core 83 of the solenoid being connected with an upturned end 84 of the gate. A coiled compression spring 85 is arranged on the core 83 between the enlarged end 86 thereof and an endwall of the solenoids are energized to open the gates 64 when the charger plungers are about to function, by their terminals being connected through conductors 87 and 88 (see Fig. 2) with contacts 89 and 90 which, during a portion of each revolution of the turret, engage adjustable, stationary, segmental, arcuate contacts 91 and 92 connected with any suitable electric power lines.

Ducts 66 leading to the charger units, Fig. 3, extend laterally from the bottom thereof at an angle opposite the direction of rotation thereof to expedite the flow of clay from the hopper into the measuring chambers by way of the ducts during rotation of the hopper. Clay mascerating knives 93 on shaft 7 cooperate with knives 94 mounted on the inner wall of the hopper to thoroughly cut up clay filter cakes fed into the hopper through the open top end thereof as the hopper rotates. After the cut up clay passes the knives, it is forced into the ducts 66 and into the measuring chambers of the charger units as the hopper rotates, by the auger 69 on the shaft 7 cooperating with an arcuate clay deflector arm 96 arranged therebelow and mounted on said shaft. Said arm has the end 97 thereof formed as the segment of a circle and of sufficient length to seal the entrance end of the ducts 66 when in full cooperation therewith. This prevents back flow of clay whilst the charge is being ejected.

Thus, in the present organization, I have provided machinery including a turntable with which there are associated a number of feeders each to be brought successively into registry with molds disposed in spaced relation on the endless mold conveyor which, when driven, also rotates the turntable. The conveyor and turntable move continuously and during this movement the feeders are actuated to deliver charges of clay successively to the molds. After being charged with clay, a mold is carried by the conveyor to the next turntable for finishing operations.

The conveyor 11—12 and molds may remain in association with the mold table of the feeder any desired length of time with a maximum association of approximately 300 degrees of travel per machine in a four unit group. It is estimated this new arrangement will permit increases in production speed on the order of 700 per cent as compared with other systems. Furthermore, since the machinery operates continuously, there is not the wear and tear on the equipment which would result from intermittently stopping and starting as in other type apparatus.

With regard to Fig. 1, the base of the machine is criss-crossed with T slots 180 in which are received the heads of inverted bolts 181 extending upwardly through holes in base clamps 182 and being secured thereto by nuts 183. The clamps have horizontal adjustment screws 184 for making minor adjustment in the location of the machines and vertical hold-down screws 185 for clamping the machine base to the floor. Any major adjustment in the location of any one or all machines can be quickly and easily accomplished by removing the clamps 182 and shifting the machine to the desired location.

While I have shown the preferred form of conveyor as comprising ring seats connected by cable sections, it will be understood that other forms of conveyor may be equally adaptable, such as, for instance, a chain conveyor or the like. It will also be understood that the machines may be driven by independent sprocket and chain in which event the mold conveyor would not be employed for the purpose of driving the machines as well as conveying the molds.

I claim:

1. Apparatus for charging jigger molds with plastic clay, including a horizontal support provided with spaced recesses therethrough for receiving mold supports, means for continuously rotating said support, means above and in register with said recesses and continuously rotatable therewith for feeding clay to molds, a plurality of mold supports and an endless, continuously traveling conveyor to which said mold supports are attached for carrying said members horizontally into interfitting relation with said recesses whereby successive molds are indexed with successive clay feeding means to receive clay therefrom.

2. Apparatus for charging jigger molds with plastic clay, comprising a horizontal support provided with spaced recesses therethrough for receiving mold supports, means for rotating said support, means movable with and mounted above and in register with said recesses for feeding clay to molds, a plurality of mold supports, and means for moving said mold supports horizontally into interfitting relation with said recesses, whereby successive molds are indexed with successive clay feeding means to receive clay therefrom.

3. Apparatus for charging jigger molds with plastic clay, comprising a horizontal support provided with spaced recesses therethrough for receiving mold supports, means for rotating said support, means for feeding clay movable with and mounted above and in register with said recesses, a plurality of mold supports, means for moving said supports horizontally into seated relation with said recesses to be rotated therewith and means operable to cause said clay feeding means to deliver charges of clay to successive molds when said mold supports are in associated relation with said recesses.

4. Apparatus for charging jigger molds with plastic clay, comprising a horizontal support provided with spaced recesses therethrough for receiving mold supports, means for rotating said support, means movable with and mounted above and in register with said recesses for feeding clay to said molds, an endless traveling conveyor passing around said support, a plurality of mold supports connected to said conveyor to be carried thereby into seated relation in said recesses and guide means mounted beside said conveyor for guiding said mold supports into said recesses.

5. Apparatus for charging jigger molds with plastic clay, comprising a horizontal support provided with spaced recesses therethrough for receiving mold supports, means for rotating said support, means movable with and mounted above and in register with said recesses for feeding clay to said molds, an endless traveling conveyor passing around said support, a plurality of mold supports connected to said conveyor to be carried thereby into seated relation in said recesses and stationary means beside said conveyor and adjacent said horizontal support for undersupporting said mold supports when in associatel relation with said recesses.

6. Apparatus for charging jigger molds with plastic clay, comprising a rotatable horizontal table provided with circumferentially spaced recesses for receiving mold supports, means movable with said table and mounted above and in register with said recesses for feeding clay to molds therebelow, and endless member in driving association with said table, mold supports carried by said member to be received in said recesses and carried therewith and means for causing said feeding means to deliver clay to molds when said mold supports are in associated relation with said recesses.

7. Apparatus for charging jigger molds with plastic clay, comprising a rotatable, horizontal support provided with spaced, circumferential recesses, clay feeding means mounted above and in register with each recess, and an endless mold conveying means having mold carrying members attached thereto formed to interfit with said recesses.

8. Apparatus for charging jigger molds with plastic clay, comprising a support having recesses for carrying mold supports through a feeding zone, means movable therewith for feeding clay to said molds in said zone and a mold conveyor having mold carrying members formed for depositing said mold carrying members directly in said recesses in said support to thereby bring said molds into register with said clay feeding means.

9. Apparatus for charging jigger molds with plastic clay which comprises, a continuously moving support for molds for carrying them through a mold filling zone, means for feeding clay to said molds in said zone movable therewith, and a continuously traveling endless mold conveyor formed for depositing molds on said moving support to be fed with clay and for removing charged molds therefrom while said support and mold conveyor are in motion.

10. Apparatus for charging jigger molds with plastic clay which comprises, a continuously moving support for mold carriers for transporting them through a mold filling zone, means movable therewith for cutting off and depositing charges of clay in successive order on molds therebelow, and a continuously traveling endless mold conveyor having mold support carriers formed to be received in successive order by said support, carried for a predetermined distance therewith whilst the mold is being charged and then removed therefrom and carried away.

11. Apparatus for charging jigger molds with plastic clay which comprises, means forming a source of clay supply having a plurality of outlets rotatable about a common axis, a table therebelow rotatable about said axis having peripheral recesses in register with said outlets, and an endless, flexible mold carrier for delivering molds to said recesses to be received therein and thereafter charged with clay from said outlets and to thereafter remove said molds from said recesses upon being charged with clay.

12. Apparatus for charging jigger molds with plastic clay which comprises, means forming a source of clay supply having a plurality of outlets rotatable about a common axis, means for forcing clay through the several outlets and severing the clay into individual charges, a table therebelow rotatable about said axis having peripheral recesses in register with said outlets, and an endless flexible mold carrier for delivering molds to said recesses to be received therein and thereafter charged with clay from said outlets and to thereafter remove said molds from said recesses upon being charged with clay.

13. Apparatus for charging jigger molds with plastic clay which comprises, means forming a source of clay supply having a plurality of outlets rotatable about a common axis, fluid operated means for progressing clay through said outlets, a table therebelow rotatable about said axis having circumferentially spaced recesses in register with said outlets, mold carrying members formed to be deposited in said recesses and means for moving said members into and out of associated relation with said recesses.

14. Apparatus for charging jigger molds with plastic clay comprising, a rotatable table having peripheral recesses, a clay discharge outlet above and in register with each recess and movable therewith, a closure for each outlet, an endless flexible mold transporting member associated with said table for delivering molds to said recesses and removing molds therefrom and means operable to open said outlet closures when a mold is in a recess therebelow and in register with said outlet to permit the passage of clay therethrough into said molds.

15. Apparatus for charging jigger molds with plastic clay comprising, a rotatable table having perimetral recesses, a clay discharge nozzle above each recess and movable therewith, fluid operated means for progressing clay through each nozzle, a closure for each nozzle, an endless flexible member for delivering molds to and removing molds from said recesses, and means operable to open said closures and actuate said fluid operated means when a mold is in register with a given nozzle to thereby effect the delivery of a charge of clay thereto.

16. Apparatus for charging jigger molds with plastic clay comprising, means forming a movable mold receiving recess, a clay discharge nozzle above said recess and movable therewith, a closure associated with said nozzle, fluid operated means for progressing clay through said nozzle and means, operable when a mold is in position to receive a charge of clay for withdrawing the closure to permit the extrusion of clay through said nozzle.

17. The combination with a clay feeder having feed outlets and peripherally recessed means for receiving and supporting molds to be fed with clay in a feeding position below said feed outlets of a mold carrier for transporting molds to and from the mold receiving means having an opening therein forming a socket for the reception of the mold and being formed externally to engage the recessed mold supporting means.

18. In combination with a plurality of clay discharge nozzles arranged to rotate continuously about a common axis, a continuously traveling endless mold conveyor arranged to travel in a path about said axis through a feeding zone to carry molds into register with said nozzles and carry them away therefrom when charged with clay, a plurality of mold lifters below and in register with said nozzles also rotatable about said axis for removing molds from said conveyor and elevating them to feeding position whilst traveling in the feeding zone, and means operable to effect the charging of a mold with clay from a nozzle during the interval of registration of the nozzle with the mold in the feeding zone.

19. Apparatus for manufacturing dinnerware and the like comprising a support for carrying molds through a charging zone, means for charging molds with clay in said zone, and a mold conveyor formed for meshing mold carriers with said support to bring molds into register with the charging means.

20. Apparatus for charging jigger molds with plastic clay comprising, a rotatable member provided with spaced, peripheral recesses, clay feeding means arranged above and in register with each recess and adapted to rotate about the axis of said rotatable member, an endless mold conveying means having mold carrying members attached thereto formed to interfit with said recesses and means, mounted for rotation about the axis of said rotatable member, for lifting a mold from a mold carrying member up to a feeding position when the mold carrying member is disposed in a recess.

21. Apparatus for charging jigger molds with plastic clay comprising, means for supporting a mold carrier at a clay feeding station including a rotatable member provided with peripheral recesses and a stationary track member therebelow, clay feeding means mounted above and in register with each recess and adapted to rotate about the axis of said rotatable support and an endless mold conveying means having mold carrying members attached thereto formed to interfit with the recesses of the rotatable member and to be at least partly supported by the track member when in interfitting relation with the recesses.

22. Apparatus for charging jigger molds with plastic clay comprising, means for carrying mold supports through a feeding station including a rotatable member provided with peripheral recesses and a stationary track member therebelow, a clay receptacle mounted to rotate on the axis of said rotatable member and having a plurality of discharge outlets arranged one above each recess, means for forcing clay from the receptacle through each discharge outlet to a mold therebelow and an endless mold conveying means having mold carrying members attached thereto, each formed to interfit with a recess and to be partly supported by said stationary track member when disposed in a recess.

23. Apparatus for manufacturing dinnerware and the like comprising a support for carrying molds in a clay feeding zone, an angularly moving clay feeder in said zone for charging the molds whilst in motion and a mold conveyor formed for delivering empty molds to said support and removing loaded molds therefrom and carrying them away.

24. Apparatus for manufacturing dinnerware and the like comprising a rotatable support for carrying molds through a clay feeding zone, an angularly moving clay feeder in said zone for charging the molds whilst in motion and a traveling endless mold conveyor formed for delivering empty molds to said support and removing loaded molds therefrom and carrying them away.

25. Apparatus for manufacturing dinnerware and the like comprising a continuously moving support for molds for carrying them through a clay feeding zone, an angularly moving clay feeder in said zone for charging the molds whilst in motion, and a continuously traveling endless mold conveyor formed for delivering empty molds to said support and removing loaded molds therefrom.

26. Apparatus for manufacturing dinnerware and the like comprising a unitary support for carrying molds through a clay feeding zone, an angularly moving clay feeder in said zone for charging the molds whilst in motion and a mold conveyor formed for delivering empty molds to said support and removing loaded molds therefrom and carrying them away.

27. In combination, clay feeding apparatus having a turntable associated therewith rotatable about a vertical axis, clay feeders mounted above said table rotatable therewith about said axis, endless flexible mold conveying means looped about said turntable, pottery molds mounted on said conveying means, to be carried thereby to said turntable and transported about said axis in register with said feeders, means for ejecting clay from said feeders into said molds when in register therewith and means operable to continuously drive said conveying means and turntable.

WILLIAM J. MILLER.

REFERENCES CITED

The following references are of record in the file of this patent:

UNITED STATES PATENTS

| Number | Name | Date |
|---|---|---|
| 2,321,471 | Emerson | June 8, 1943 |
| 2,349,292 | Miller et al. | May 23, 1944 |